3,069,457
SULFIDE-NITRILE COMPOUNDS
John W. Lynn, Charleston, and Richard L. Roberts, Milton, W. Va., assignors to Union Carbide Corporation, a corporation of New York
No Drawing. Filed Dec. 28, 1959, Ser. No. 862,081
1 Claim. (Cl. 260—465.4)

This invention relates to sulfide-nitrile compounds as new compositions of matter, and to processes for their production.

The novel sulfide-nitrile compounds of this invention can be depicted by the general formula:

$$R-S-CH_2-CH(R')-CH(R'')-CN$$

wherein R is a member selected from the group consisting of aryl radicals; hydroxyhydrocarbon radicals free of aliphatic unsaturation, including hydroxyalkyl and hydroxyaryl radicals; and carboxyhydrocarbon radicals free of aliphatic unsaturation, including carboxyalkyl and carboxyaryl radicals; and R' and R'' are members selected from the group consisting of hydrogen and alkyl radicals. Preferably R is a radical containing from 1 to 20 carbon atoms, and when R' and R'' are alkyl radicals, they preferably contain from 1 to 4 carbon atoms. Illustrative examples of the novel sulfide-nitrile compounds of this invention are such compounds as 4-(phenylmercapto)butyronitrile,
4-(2-methylphenylmercapto)butyronitrile,
4-(3-methylphenylmercapto)-2-methylbutyronitrile,
4-(3-methylphenylmercapto)-2-ethylbutyronitrile,
4-(4-methylphenylmercapto)-3-methylbutyronitrile,
4-(4-methylphenylmercapto)-3-ethylbutyronitrile,
4-(4-biphenylmercapto)butyronitrile,
4-(2-naphthylmercapto)butyronitrile,
4-(2,3-dimethylphenylmercapto)butyronitrile,
4-(3,4-dimethylphenylmercapto)-2-methylbutyronitrile,
4-(3,4-dimethylphenylmercapto)-2-isopropylbutyronitrile,
4-(2,5-dimethylphenylmercapto)-3-methylbutyronitrile,
4-(2,5-dimethylphenylmercapto)-3-isopropylbutyronitrile,
4-(2-anthrylmercapto)butyronitrile,
4-(2-phenanthrylmercapto)butyronitrile,
5-thia-7-hydroxyheptanonitrile,
3-methyl-5-thia-7-hydroxyheptanonitrile,
5-thia-7,8-dihydroxyoctanonitrile,
5-thia-16-hydroxyhexadecanonitrile,
5-thia-25-hydroxypentacosanonitrile,
4-(4-hydroxyphenylmercapto)butyronitrile,
4-(3-hydroxyphenylmercapto)-2-methylbutyronitrile,
4-(3-hydroxyphenylmercapto)-2-butylbutyronitrile,
4-(2-hydroxyphenylmercapto)-3-methylbutyronitrile,
4-(2-hydroxyphenylmercapto)-3-butylbutyronitrile,
4-(2,4-dihydroxyphenylmercapto)butyronitrile,
4-(2-hydroxy-4-methylphenylmercapto)butyronitrile,
4-(2-hydroxymethylphenylmercapto)butyronitrile,
4-(2-hydroxymethyl-3-methylphenylmercapto)butyronitrile,
4-(4-hydroxytolylmercapto)butyronitrile,
3-thia-6-cyanohexanoic acid,
4-thia-7-cyanoheptanoic acid,
2-methyl-3-thia-6-cyanohexanoic acid,
3-carboxy-4-thia-7-cyanoheptanoic acid,
13-thia-16-cyanohexadecanoic acid,
21-thia-24-cyanotetracosanoic acid,
4-(2,3-dicarboxyphenylmercapto)butyronitrile,
4-(2-carboxy-3-methylphenylmercapto)butyronitrile,
4-(3-carboxy-4-methylphenylmercapto)-2-methylbutyronitrile,
4-(2-carboxyphenylmercapto)-3-methylbutyronitrile,
4-(2-carboxymethylphenylmercapto)butyronitrile,
4-(3-carboxymethyl-4-methylphenylmercapto)butyronitrile,
4-(4-carboxytolylmercapto)butyronitrile and the like.

The novel sulfide-nitrile compounds of the instant invention can be produced by the reaction of a suitable thiol compound with a suitable unsaturated nitrile compound. The thiol compounds which can be employed as starting materials in preparing the novel sulfide-nitrile compounds of the instant invention can be depicted by the general formula:

$$R-S-H$$

wherein R is as above defined. Illustrative of such starting materials are such compounds as benzenethiol, 2-methylbenzenethiol, 3-methylbenzenethiol, 4-methylbenzenethiol, biphenylthiol, 2-naphthalenethiol, 2,3-dimethylbenezenethiol, 3,4-dimethylbenzenethiol, 2,5-dimethylbenzenethiol, 2-anthracenethiol, 2-phenanthrenethiol, 2-mercaptoethanol, 2-hydroxy-3-mercaptopropanol, 11-mercaptohendecanol, 20-mercaptoeicosanol, 4-mercaptophenol, 3-mercaptophenol, 2-mercaptophenol, 1,3-dihydroxy-4-mercaptobenzene, 2-mercapto-5-methylphenol, 2-hydroxymethylbenzenethiol, 2-hydroxymethyl-3-methylbenzenethiol, 4-methylmercaptophenol, mercaptoacetic acid, 3-mercaptopropionic acid, 2-mercaptopropionic acid, 2-mercaptosuccinic acid, 12-mercaptolauric acid, 20-mercaptoeicosanoic acid, 3-mercaptophthalic acid, 2-mercapto-6-methylbenzoic acid, 3-mercapto-6-methylbenzoic acid, 2-mercaptobenzoic acid, 2-mercaptophenylacetic acid, 2-methyl-5-mercaptophenylacetic acid, 4-mercaptomethylbenzoic acid and the like.

The unsaturated nitrile compounds which can be employed as starting materials in preparing the novel sulfide-nitrile compounds of the instant invention can be depicted by the general formula:

$$CH_2=C(R')-CH(R'')-CN$$

wherein R' and R'' are as above defined. Illustrative of such starting materials are such compounds as allyl cyanide, 2-methyl-3-butenonitrile, 2-ethyl-3-butenonitrile, 2-isopropyl-3-butenonitrile, 2-butyl-3-butenonitrile, methallyl cyanide, 3-ethyl-3-butenonitrile, 3-isopropyl-3-butenonitrile, 3-butyl-3-butenonitrile and the like.

The process of the instant invention, which comprises reacting a thiol compound with an unsaturated nitrile compound, can be illustrated by the following equation:

$$R-S-H+CH_2=C(R')-CH(R'')-CN \rightarrow$$
$$R-S-CH_2-CH(R')-CH(R'')-CN$$

wherein R, R' and R'' are as above defined. Thus, for example, 4-(phenylmercapto)butyronitrile can be prepared by the reaction of benzenethiol with allyl cyanide, and 3-methyl-5-thia-7-hydroxyheptanonitrile can be prepared by the reaction of 2-mercaptoethanol with methallyl cyanide.

When effecting reaction according to the process of the instant invention, it is preferable, but not necessary, to employ an excess of the unsaturated nitrile compound over the stoichiometric amount required to react with the thiol compound present in order to help ensure complete conversion of the thiol compound. Amounts of unsaturated nitrile compound ranging from the stoichiometric equivalent to a 2:1 mole ratio are preferred for this purpose, but amounts of from as little as 0.5 mole to as much as 10 moles per mole of thiol compound present can also be employed; however, when an amount of unsaturated nitrile compound which is less than the stoichiometric equivalent is employed, the yield of the desired reaction product is considerably lowered.

Reaction between a thiol compound and an unsaturated nitrile compound according to the process of the instant invention is prompted by a free radical promoting catalyst, including, for example, ultraviolet light, oxygen, air, peroxides, percarbonates, peresters and azo compounds. Among the peroxides which can be employed as catalysts may be mentioned sodium peroxide, barium peroxide, magnesium peroxide, diethyl peroxide, dibenzoyl peroxide, distearyl peroxide, di-tertiary-butyl peroxide, di-tertiary-butyl hydroperoxide, diacetyl peroxide, distearoyl peroxide and acetyl benzoyl peroxide. Specific examples of the azo compounds which can be employed include α,α'-azo-bis-isobutyronitrile and 2,2'-dicyanoazobenzene. Illustrative of the percarbonates which can be employed are diisopropyl percarbonate and di-tertiary-butyl percarbonate, while a typical perester would be acetaldehyde monoperacetate. Whether other catalysts are employed or not, the reaction is preferably conducted in the presence of ultraviolet light, which has the effect of accelerating the reaction rate.

When a catalyst other than ultraviolet light, oxygen, or air is employed in promoting reaction between a thiol compound and an unsaturated nitrile compound according to the process of the instant invention, it should be employed in an amount of from as low as 0.01 percent by weight to as high as 1 percent by weight, preferably from 0.1 percent by weight to 0.5 percent by weight, of the combined weight of reactants employed.

Reaction according to the process of the instant invention may be effected in an inert liquid solvent. By an inert liquid solvent is meant a liquid solvent in which the starting materials are soluble to an extent whereby they are brought into reactive contact and which itself is essentially nonreactive under the conditions of the reaction. Suitable inert liquid solvents which can be employed include hydrocarbons free of aliphatic unsaturation, such as hexane, cyclohexane, heptane, benzene, toluene, and the like; ethers free of aliphatic unsaturation, such as isopropyl ether, ethyl ether, dioxane, tetrahydrofuran, and the like; and esters free of aliphatic unsaturation, such as butyl acetate, ethyl acetate, and the like. In general, an amount of solvent ranging from 0 to 10 times, preferably from 0 to 5 times, the weight of reactants present can be effectively employed.

Reaction according to the process of the instant invention readily occurs at temperatures ranging from as low as 0° C. to as high as 200° C., but is preferably effected at temperatures ranging from 25° C. to 100° C.

Atmospheric pressure is usually employed in effecting reaction according to the process of the instant invention. However, pressures both above and below atmospheric pressure, for example pressures ranging from as low as 100 mm. Hg to as high as 1000 p.s.i., can also be employed.

Due to the presence of various functional groups therein, the sulfide-nitrile compounds of the instant invention are extremely useful intermediates for the preparation of numerous other organic compounds. By way of illustration, the sulfur atom present in the sulfide-nitrile compounds of the instant invention can be oxidized to produce corresponding sulfone-nitrile compounds, and the nitrile group present can be hydrolyzed to produce an acid, which can in turn be esterified to produce the ester thereof.

The novel sulfide-nitrile compounds of the instant invention have a high degree of biological activity, and can be used as nematocides and herbicides.

The following examples are set forth for purposes of illustration so that those skilled in the art may better understand this invention, and it should be understood that they are not to be construed as limiting this invention in any manner.

EXAMPLE I

*Preparation of 4-(Phenylmercapto)Butyronitrile*

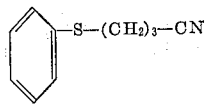

An admixture of 201 grams (3 moles) of allyl cyanide and 275 grams (2.5 moles) of benzenethiol was prepared and stirred at room temperature over a period of 22 hours, during which time reaction occurred slowly. At the end of this time, 5 grams of benzoyl peroxide were added and the resulting mixture was stirred over a period of 28 hours while irradiated with ultraviolet light from an ultraviolet sun lamp at temperatures ranging from 7° C. to 118° C. Following this, the mixture was vacuum distilled at a temperature of 150° C. at 10 mm. Hg pressure to remove unreacted allyl cyanide and benzenethiol. The remaining residue was then distilled under reduced pressure and 310 grams of 4-(phenylmercapto)butyronitrile, boiling at a temperature of 132–133° C. at 2.0 mm. Hg pressure, were collected. This represented a yield of about 70 percent of theoretical. The product was an oily liquid which had a specific gravity of 1.0919 (at 20° C.) and an index of refraction of 1.5640 (at 30° C.). The product was identified as 4-(phenylmercapto)butyronitrile by its infrared absorption spectrum and chemical analysis. *Analysis.*—Calculated for $C_{10}H_{11}NS$: C, 67.75%; H, 6.26%; N, 7.90%. Found: C, 68.33%; H, 5.91%; N, 7.42%.

EXAMPLE II

*Preparation of 3-Thia-6-Cyanohexanoic Acid*

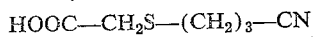

An admixture of 168 grams (2.5 moles) of allyl cyanide and 243 grams (2.5 moles) of mercaptoacetic acid was prepared and stirred over a period of four hours while irradiated with ultraviolet light from an ultraviolet sun lamp at temperatures ranging from 24° C. to 65° C. At the end of this time, the mixture was vacuum distilled at a temperature of 100° C. to remove unreacted allyl cyanide and mercaptoacetic acid. The desired product of 3-thia-6-cyanohexanoic acid which remained in the distillation flask was a viscous liquid which had a specific gravity of 1.2556 (at 20° C.), an index of refraction of 1.5162 (at 30° C.), and a molecular weight of 160 (as determined by the Menzies-Wright boiling point method). About 347 grams of 3-thia-6-cyanohexanoic acid were recovered in this manner. This represented a yield of about 87.2 percent of theoretical. The product was identified as 3-thia-6-cyanohexanoic acid by chemical analysis.

To a glass reaction flask fitted with a glass-packed column and a decanter-type still head were charged 319 grams (2.0 moles) of the 3-thia-6-cyanohexanoic acid prepared in accordance with the above procedure, 185 grams (4.0 moles) of ethanol, 200 ml. of benzene, and 3.0 grams of sulfuric acid. The mixture was heated at its refluxing temperature while an azeotrope of water (formed during the esterification) and benzene was removed by distillation. After 29 hours of refluxing, the evolution of water had essentially ceased, and the reaction was discontinued. Benzene and excess ethanol were then removed by distillation at atmospheric pressure. Following this, the residue remaining in the distillation flask was distilled under reduced pressure and ethyl 3-thia-6-cyanohexanoate, boiling at a temperature of 138–148° C. at 2.8–6.0 mm. Hg pressure, was collected in a yield of about 42.7 percent of theoretical. The product had an index of refraction of 1.4770 (at 30° C.), a density of 1.1030 (at 30° C.), and a molecular weight of 180±4 (as determined by the Menzies-Wright boiling point method). The product was identified as ethyl 3-thia-6-cyanohexanoate by chemical analysis. *Analysis.*—Calculated for $C_6H_9NO_2S$: C, 51.31%; H, 7.00%; N, 7.48%. Found: C, 51.26%; H, 6.70%; N, 7.09%.

EXAMPLE III

*Preparation of 5-Thia-7-Hydroxyheptanonitrile*

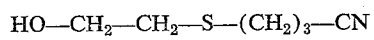

An admixture of 342 grams (5 moles) of allyl cyanide, 430 grams (5.5 moles) of 2-mercaptoethanol and 0.8 gram of benzoyl peroxide was prepared and stirred over a period of five hours at temperatures ranging from 45° C. to 65° C. At the end of this time, the mixture was vacuum distilled to remove unreacted allyl cyanide and 2-mercaptoethanol. The remaining residue was then distilled under reduced pressure and 270 grams of 5-thia-7-hydroxyheptanonitrile, boiling at a temperature of 140° C. at 2.0 mm. Hg pressure, were collected. This represented a yield of about 37.2 percent of theoretical. The product was an oily liquid which had a specific gravity of 1.100 (at 20° C.) and an index of refraction of 1.5034 (at 30° C.). The product was identified as 5-thia-7-hydroxyheptanonitrile by its infrared absorption spectrum and chemical analysis. *Analysis.*—Calculated for $C_6H_{11}ONS$: C, 49.62%; H, 7.64%; N, 9.65%. Found: C, 48.88%; H, 7.44%; N, 9.27%.

EXAMPLE IV

*Preparation of 3-Methyl-5-Thia-7-Hydroxyheptanonitrile*

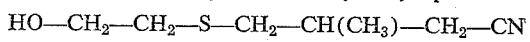

An admixture of 445 grams (5.5 moles) of methallyl cyanide, 285 grams (3.65 moles) of 2-mercaptoethanol and 3.6 grams of benzoyl peroxide was prepared and stirred over a period of 44 hours at temperatures ranging from 70° C. to 85° C. At the end of this time, the mixture was vacuum distilled to remove unreacted methallyl cyanide and 2-mercaptoethanol. The remaining residue was then distilled under reduced pressure and 496 grams of 3-methyl-5-thia-7-hydroxyheptanonitrile, boiling at a temperature of 146° C. at 2.0 mm. Hg pressure, were collected. This represented a yield of about 85 percent of theoretical. The product had a specific gravity of 1.0735 (at 20° C.) and an index of refraction of 1.4972 (at 30° C.). The product was identified as 3-methyl-5-thia-7-hydroxyheptanonitrile by chemical analysis. *Analysis.*—Calculated for $C_7H_{13}ONS$: C, 52.79%; H, 8.23%; N, 8.80%. Found: C, 52.21%; H, 8.20%; N, 8.80%.

EXAMPLE V

*Use of 4-(Phenylmercapto)Butyronitrile as a Nematocide*

Into each of two Petri dishes were placed 3 watch glasses, and 0.4 ml. of a water suspension containing at least 25 vinegar eel nematodes (*Panagrellus redivivus*) was added to each watch glass. To each watch glass in one of the two Petri dishes was added 0.1 ml. of a test emulsion having a concentration of 0.5 percent by weight of 4-(phenylmercapto)butyronitrile. The test emulsion was prepared by dissolving 1000 mg. of 4-(phenylmercapto)-butyronitrile in 5 ml. of an acetone-emulsifier solution [prepared by admixing 100 ml. of acetone and 5 ml. of "Triton B-1956" (a modified phthalic glycerol alkyd resin, manufactured by Rohm and Haas Co., Washington Square, Philadelphia, Pa.)] and diluting the resulting solution with water. A similar emulsion free from 4-(phenylmercapto)butyronitrile was added to each watch glass in the other Petri dish which was employed as a control. Both Petri dishes were then covered and left undisturbed under controlled conditions of heat and humidity (80±2° F., 50±5% relative humidity) for 24 hours. At the end of this time, all of the nematodes in the dish containing 4-(phenylmercapto)butyronitrile had been killed, while all the nematodes in the control dish survived.

EXAMPLE VI

*Use of 4-(Phenylmercapto)Butyronitrile as a Herbicide*

To each of two Petri dishes containing two sheets of filter paper were added 25 *Solium perenne* (perennial rye grass) seeds and 25 *Raphanus sativum* (radish) seeds. To one of the Petri dishes were added 5 ml. of a test emulsion having a concentration of 1000 p.p.m. of 4-(phenylmercapto)butyronitrile. The test emulsion was prepared by dissolving 1000 mg. of 4-(phenylmercapto)-butyronitrile in 50 ml. of an acetone-emulsifier solution [prepared by admixing 1000 ml. of acetone and 5 ml. of "Triton X-155" (an alkyl aryl polyether alcohol, manufactured by Rohm and Haas Co., Washington Square, Philadelphia, Pa.)] and diluting the resulting solution with water. A similar emulsion free from 4-(phenylmercapto)butyronitrile was added to the other Petri dish which was employed as a control.

The Petri dishes were then incubated in total darkness at a constant temperature of 20° C. for 5 days. At the end of this time, the dishes were examined and it was found that only 84 percent of the *Solium perenne* seeds and 60 percent of the *Raphanus sativum* seeds that had been treated with 4-(phenylmercapto)butyronitrile had germinated, while 96 percent of the *Solium perenne* seeds and 100 percent of the *Raphanus sativum* seeds in the control dish had germinated. It was also noted that the treated species were stunted in growth as compared to the untreated species.

EXAMPLE VII

*Use of 5-Thia-7-Hydroxyheptanonitrile as a Herbicide*

To each of two Petri dishes containing two sheets of filter paper were added 25 *Solium perenne* (perennial rye grass) seeds and 25 *Raphanus sativum* (radish) seeds. To one of the Petri dishes were added 5 ml. of a test emulsion having a concentration of 1000 p.p.m. of 5-thia-7-hydroxyheptanonitrile. The test emulsion was prepared by dissolving 1000 mg. of 5-thia-7-hydroxyheptanonitrile in 50 ml. of an acetone-emulsifier solution [prepared by admixing 1000 ml. of acetone and 5 ml. of "Triton X-155" (an alkyl aryl polyether alcohol, manufactured by Rohm and Haas Co., Washington Square, Philadelphia, Pa.)] and diluting the resulting solution with water. A similar emulsion free from 5-thia-7-hydroxyheptanonitrile was added to the other Petri dish which was employed as a control.

The Petri dishes were then incubated in total darkness at a constant temperature of 20° C. for 5 days. At the end of this time, the dishes were examined and it was found that only 48 percent of the *Solium perenne* seeds and 44 percent of the *Raphanus sativum* seeds that had been treated with 5-thia-7-hydroxyheptanonitrile had germinated, while 98 percent of the *Solium perenne* seeds and 98 percent of the *Raphanus sativum* seeds in the control dish had germinated. It was also noted that the treated species were severely stunted in growth as compared to the untreated species.

EXAMPLE VIII

*Use of 3-Methyl-5-Thia-7-Hydroxyheptanonitrile as a Herbicide*

To each of two Petri dishes containing two sheets of filter paper were added 25 *Solium perenne* (perennial rye grass) seeds and 25 *Raphanus sativum* (radish) seeds. To one of the Petri dishes were added 5 ml. of a test emulsion having a concentration of 1000 p.p.m. of 3-methyl-5-thia-7-hydroxyheptanonitrile. The test emulsion was prepared by dissolving 1000 mg. of 3-methyl-5-thia-7-hydroxyheptanonitrile in 50 ml. of an acetone-emulsifier solution [prepared by admixing 1000 ml. of acetone and 5 ml. of "Triton X-155" (an alkyl aryl polyether alcohol, manufactured by Rohm and Haas Co., Washington, Philadelphia, Pa.)] and diluting the resulting solution with water. A similar emulsion free from 3-methyl-5-thia-7-hydroxyheptanonitrile was added to the other Petri dish which was employed as a control.

The Petri dishes were then incubated in total darkness at a constant temperature of 20° C. for 5 days. At the end of this time, the dishes were examined and it was found that only 88 percent of the *Solium perenne* seeds and 84 percent of the *Raphanus sativum* seeds that had been treated with 3-methyl-5-thia-7-hydroxyheptanonitrile had germinated, while 100 percent of the *Solium perenne* seeds and 96 percent of the *Raphanus sativum* seeds in the control dish had germinated. It was also noted that the treated species were stunted in growth as compared to the untreated species.

What is claimed is:

Ethyl 3-thia-6-cyanohexanoate.

References Cited in the file of this patent

UNITED STATES PATENTS

| | | |
|---|---|---|
| 2,324,936 | Kroeper et al. | July 20, 1943 |
| 2,429,391 | Cass | Oct. 21, 1947 |
| 2,542,768 | Gresham et al. | Feb. 20, 1951 |

OTHER REFERENCES

Ross et al.: J.A.C.S., vol. 73 (1951), pages 540–542.
Truce et al.: J.A.C.S., vol. 76 (1954), page 698.
Cagniant et al.: C.A., vol. 41 (1947), page 1669.
Behrens et al.: C.A., vol. 43 (1949), page 2272.
Kjaer et al.: C.A., vol. 49 (1955), page 5303.
(Copies of above in Scientific Library.)